United States Patent [19]

Starr

[11] 4,047,653
[45] Sept. 13, 1977

[54] FILM RETRIEVER

[76] Inventor: Michael T. Starr, 16 Old Faith Road, Shrewsbury, Mass. 01545

[21] Appl. No.: 660,691

[22] Filed: Feb. 23, 1976

[51] Int. Cl.² ............................................. G03B 1/56
[52] U.S. Cl. ..................................... 226/92; 81/3 R; 294/34
[58] Field of Search .................. 226/1, 92; 214/1.7; 81/3 R; 294/33, 34

[56] References Cited

U.S. PATENT DOCUMENTS

| | | | |
|---|---|---|---|
| 2,777,725 | 1/1957 | Weir | 294/34 |
| 3,141,695 | 7/1964 | Furber | 81/3 R X |
| 3,261,237 | 7/1966 | Sentiff | 81/3 R |
| 3,864,993 | 2/1975 | Hovkind | 81/3 R |

Primary Examiner—Richard A. Schacher
Attorney, Agent, or Firm—Norman S. Blodgett; Gerry A. Blodgett

[57] ABSTRACT

Device for retrieving the free end of a roll of film from a film cartridge; curved inner and outer jaws are movable with respect to one another. The operation involves inserting the jaw ends into the cartridge, rotating the film within the cartridge until the free end is between the jaw ends, and grasping the film with the jaw ends.

2 Claims, 7 Drawing Figures

U.S. Patent  Sept. 13, 1977  4,047,653
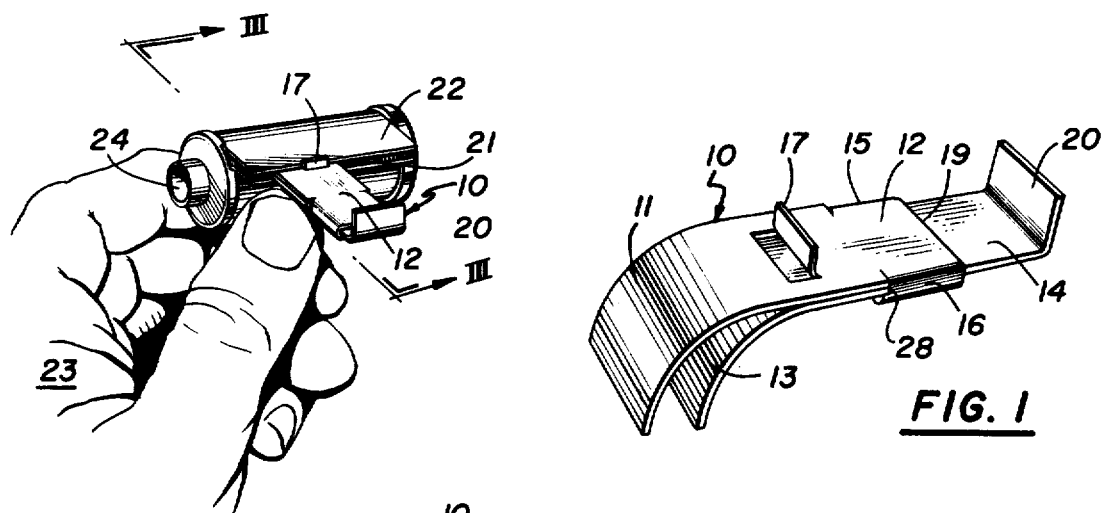
FIG. 1
FIG. 2
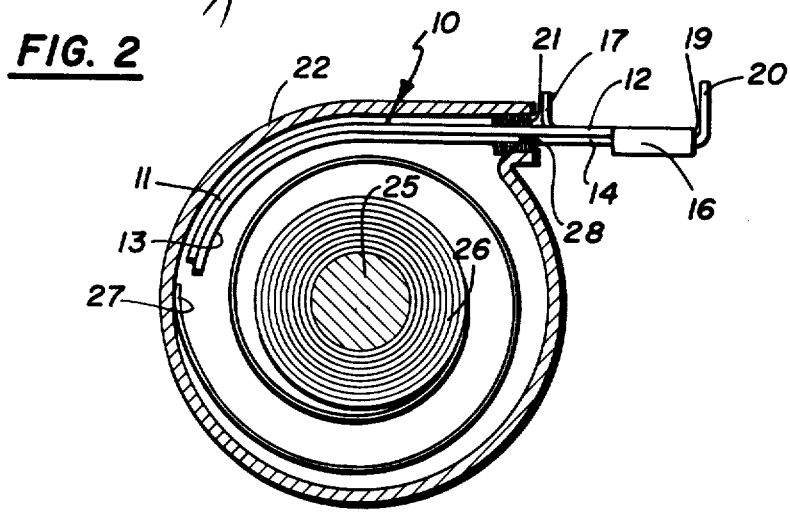
FIG. 3
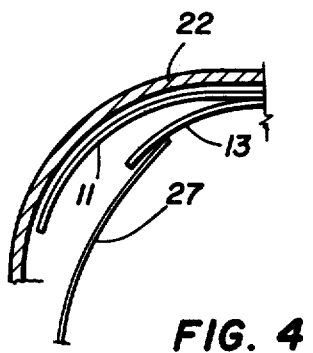
FIG. 4
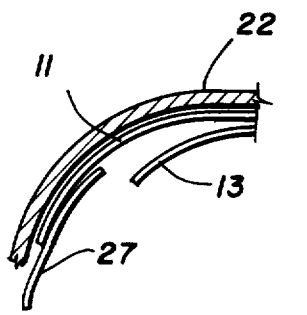
FIG. 5
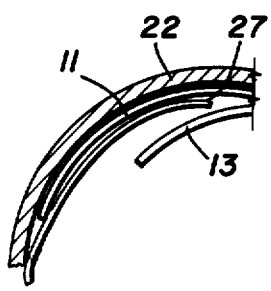
FIG. 6
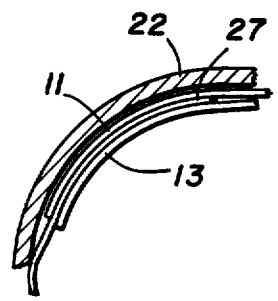
FIG. 7

FILM RETRIEVER

BACKGROUND OF THE INVENTION

Among amateur and professional photographers, one of the most popular film formats is the 35 millimeter size. In the 35 millimeter system, the film is normally carried on a spool within a light-tight cylindrical cartridge. The spool is driven at the end of the cartridge and the film passes through a tangentially-opening entrance in the cylindrical wall of the cartridge. The facing edges of the entrance are provided with black plush to provide a light seal when nothing is passing through the entrance. The light seal is improved further because the height of the entrance is small to minimize light passage.

This cartridge system has the disadvantage that, when the cartridge is to be removed from the camera, the film must be wound back into the cartridge to avoid exposure to light. Most 35 millimeter cameras do not provide any accurate method of winding up the film without causing the end of the film (the leader) to pass through the entrance into the cartridge. Once the leader is in the cartridge it is very difficult to retrieve it in order to process the film or use any unexposed portions.

This loss of the leader occurs in two very different situations. When the roll of film is completely used, the film is wound back into the cartridge and it is desirable to have the leader available to remove the film from the cartridge for processing. If the leader is not available, the cartridge can be broken open to allow removal of the film. While this approach can be somewhat difficult and inconvenient for both the amateur and commercial processor, it is a viable solution. The leader is also lost in the situation where the photographer has partially used a roll of film and desires to change to another type of film. The photographer must return the original film to the interior of the cartridge and, in doing so, the leader is often lost. If the photographer does not wish to waste the remainder of the original roll of film, he must somehow retrieve the leader. He may, of course, break open the cartridge, which must be done in a dark room, but in the process, often ruins the cartridge so that the film cannot be used without obtaining a new cartridge.

Recognizing the value of being able to retrieve the leader without ruining the cartridge in both of these situations, various prior art devices have been devised to solve the problem. For example, in the Sentiff U.S. Pat. No. 3,261,237, issued July 19, 1966, a specially-shaped, elongated tool is provided by which a photographer can reach into the entrance of the cartridge and, by careful manipulation, extract the leader. While certainly an ingenious concept, use of this device does require a considerable degree of manual dexterity. Furthermore, proper manipulation of the device requires that it be of a substantial and sometimes inconvenient size. Another interesting device is that shown in the U.S. Pat. No. 3,864,993, to Hovind issued Feb. 11, 1975. This device uses an adhesive patch at the end of a flexible blade to reach in and retrieve the leader. Of course, the adhesive strip has a finite useful life, and the successful removal of the leader often requires a trial and error approach and considerable skill. These and other difficulties experienced with the prior art devices have been obviated in a novel manner by the present invention.

It is, therefore, an outstanding object of the invention to provide a device for the retrieval of a film leader from the interior of a 35 millimeter film cartridge.

Another object of this invention is the provision of a device which will retrieve the leader of a roll of film in a cartridge with a minimum requirement of skill and care by the operator.

A further object of the present invention is the provision of a film retrieval device which is simple and inexpensive to manufacture.

It is another object of the instant invention to provide a film retrieval device which is small and compact, so that it is convenient to carry.

A still further object of the invention is the provision of a film retrieval device which minimizes the possibility of damage to the film itself.

It is a further object of the invention to provide a film retrieval device which is not subject to physical deterioration and is, therefore, capable of a long and useful life.

With these and other objects in view, as will be apparent to those skilled in the art, the invention resides in the combination of parts set forth in the specification and covered by the claims appended hereto.

SUMMARY OF THE INVENTION

In general, the invention has to do with a device for retrieving the film leader from the interior of a film cartridge. The device consists of an outside jaw end and an inside jaw end. Inserting means is provided to allow the insertion of the jaw ends into the film cartridge through a tangentially-opening entrance. Separating and closing means is provided by which the jaws can be opened and closed while within the cartridge. The invention also involves a method by which the leader is retrieved by inserting jaws through the entrance of the cartridge, opening the jaws, rotating the film so that the leader comes between the jaws, and then closing the jaws, whereupon the device and leader can then be extracted from the cartridge.

BRIEF DESCRIPTION OF THE DRAWINGS

The character of the invention, however, may be best understood by reference to one of its structural forms, as illustrated by the accompanying drawings, in which:

FIG. 1 is a perspective view of a device embodying the principles of the present invention, FIG. 2 is a perspective view in which the device shown in FIG. 1 is inserted into the entrance of a 35 millimeter film cartridge, FIG. 3 is a sectional view taken along line III—III of FIG. 2, FIG. 4 is a diagrammatic view of one step in the operation of the present invention, FIG. 5 is a diagrammatic view of another step in the operation of the present invention, FIG. 6 is a diagrammatic view of still another step in the operation of the present invention, and FIG. 7 is a diagrammatic view of still another step in the operation of the present invention.

DESCRIPTION OF THE PREFERRED EMBODIMENT

Referring first to FIG. 1, in which the general features of the present invention are best shown, the film retriever device, indicated generally by the numeral 10, is shown to include an outer jaw end 11 connected to an outer base 12 and an inner jaw end 13 connected to an inner base 14. In the preferred embodiment, the entire device is formed from sheets of thin, resilient metal. The jaw ends 11 and 13 each have a cylindrical curve with a radius approximately equal to the radius of the inner surface of a standard 35 millimeter film cartridge. The bases 12 and 14 are held parallel to and adjacent one another and are limited to linear sliding motion with respect to another by portions of one base which extend around the edges of the other. In the preferred embodiment, tabs 15 and 16 of base 12 extend around the edges of base 14 to accomplish this purpose. The combined thickness of the two bases 12 and 14 is substantially less than the height of the tangentially-opening entrance found in the standard 35 millimeter film cartridge.

The base 12 is provided with a stop 17 extending generally perpendicular to the base 12 and a base edge 19 defining the rearmost portion of the base 12. The base 14 has an operating tab 20 which extends perpendicularly to its length. Relative motion between base edge 19 and operating tab 20 toward and away from one another causes parallel, exclusively-linear motion between bases 12 and 14, thereby providing a means for separating and closing jaw ends 11 and 13, while maintaining a constant, thin cross-section of the bases 12 and 14 in the area of the stop 17.

FIG. 2 shows the device 10 after it has been moved from the separated position shown in FIG. 1 to a closed position and has been inserted through the tangentially-opening entrance 21 of a standard 35 millimeter film cartridge 22. The device is inserted into the entrance 21 until stop 17 prevents further insertion. At this point, the jaw ends 11 and 13 will be in their optimum position for carrying out the film retrieval operation.

During this operation the cartridge is held in the user's left hand 23. The film within the cartridge can be rotated by turning the external spool extension 24. In the standard 35 millimeter film cartridge, and looking at the spool extension 24, counter-clockwise rotation will be in the wind-up direction and will draw the film into the cartridge. Conversely, clockwise rotation would be in the wind-out direction which would move film out of the cartridge except that the leader is normally impeded by the various light seals at the entrance.

FIG. 3 shows a cross-sectional view through the end of the cartridge 22 showing the spool 25, the film 26 wrapped around the spool 25, and the leader 27 at the end of the film. The device 10 has been inserted through the entrance 21 until the stop 17 engages the upper edge of the entrance 21. The outside jaw 11 and inside jaw 13 generally follow the inside cylindrical surface of the cartridge 22. The insertion of the closed device into the film cartridge 22 to achieve the position shown in FIG. 3 is the first step in the method of using the device.

In the second step, the operating tab 20 is drawn back from base edge 19 until shoulders 28 engage tabs 15 and 16, while stop 17 remains against the edge of the cartridge. The result is that the bases 12 and 14 slide linearly with respect to one another through the entrance 21 and the jaw ends 11 and 13 separate from one another. The jaw end 11 remains against the inside cylindrical wall of the chamber and the inside jaw 13 moves into contact with the roll of film 26. The effect of the inner base 14 being drawn partially through the entrance and of the contact of the inner jaw 13 with the film is to substantially flatten inner jaw 13 so that it lies closer to outer jaw 11 than would otherwise be the case. This position of the jaw ends is shown in FIG. 4. The spool extension 24 is then rotated in a counter-clockwise or wind-up direction, so that the leader moves along the inner surface of the inner jaw end 13 as shown in FIG. 4.

A slow, wind-up rotation is continued until the leader 27 passes the jaw end 13 and snaps across the jaw end 11. This situation is indicated by a significant audible signal as the film leader 27 snaps across to the outer jaw 11. At this point, the wind-up rotation is stopped.

In the next step, the spool extension 24 is rotated in a clockwise or wind-out direction, so that the film leader 27 moves upward into the space between the outer jaw 11 and the inner jaw 13 as shown in FIG. 6. Because the end of the leader 27 rests on the smooth inner surface of the outer jaw 11, the leader 27 moves into the nip between the jaw ends without difficulty. The clockwise rotation is continued until a sudden increase in resistance is noted.

In the next step, as shown in FIG. 7, the jaw ends 11 and 13 are biased toward one another by bringing the device to its closed position. This is accomplished, of course, by moving operating tab 20 back toward base edge 19. The result is that the leader 27 is securely captured and clamped between the jaw ends 11 and 13. It is found that this capture of the leader 27 is almost always successful if the operator prevents back-rotation of the film as the jaw ends are closed by holding the spool extension 24 against rotation. The device 10 is then extracted from the entrance 21, and with it, the film leader.

If the above method of utilizing the device is followed carefully, the operation can be accomplished in a matter of seconds. Furthermore, the operation is almost always successful.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A device for retrieving the film leader from the inside of a film cartridge, comprising:
   a. an outside jaw end,
   b. an inside jaw end, each jaw end having a curved cylindrical surface with a radius approximately equal to that of the cartridge, each jaw end being attached to a generally flat base, and each jaw end and base being formed of a thin sheet of resilient material,
   c. an inserting means adapted to allow the insertion of the jaw ends into the film cartridge,
   d. a separating means adapted to cause separation of the jaw ends from time to time while they are in the cartridge, and
   e. a closing means adapted to bias the jaw ends toward one another from time to time while they are in the cartridge, the bases of the jaws being secured parallel to and are linearly slideable with respect to one another to form the separating and closing means, the combined thickness of the bases being substantially less than the smallest dimension of a tangentially-opening entrance in the cartridge, so that the device can pass through the entrance to form the inserting means and the bases can slide with respect to one another while in the entrance, a portion of one of the bases wrapping around a portion of the other base to hold the bases in parallel and to allow linear relative movement.

2. A device as recited in claim 1, wherein a stop is provided to limit the insertion of the device to an optimum amount.

* * * * *